(12) United States Patent
Meyer

(10) Patent No.: US 8,712,808 B2
(45) Date of Patent: Apr. 29, 2014

(54) COMPUTER PROGRAM, SYSTEM, AND METHOD FOR MAPPING SOCIAL SECURITY CLAIMING STRATEGIES

(71) Applicant: Social Security Solutions, Inc., Leawood, KS (US)

(72) Inventor: William Meyer, Leawood, KS (US)

(73) Assignee: Social Security Solutions, Inc., Leawood, KS (US)

( * ) Notice: Subject to any disclaimer, the term of this patent is extended or adjusted under 35 U.S.C. 154(b) by 0 days.

(21) Appl. No.: 13/827,583

(22) Filed: Mar. 14, 2013

(65) Prior Publication Data

US 2013/0262151 A1 Oct. 3, 2013

Related U.S. Application Data

(60) Provisional application No. 61/618,204, filed on Mar. 30, 2012.

(51) Int. Cl.
*G06Q 10/00* (2012.01)

(52) U.S. Cl.
USPC .............................................. 705/4; 705/1.1

(58) Field of Classification Search
USPC ........................................................ 705/1.1
See application file for complete search history.

(56) References Cited

U.S. PATENT DOCUMENTS

| | | | | |
|---|---|---|---|---|
| 7,398,241 | B2 * | 7/2008 | Fay et al. | 705/36 R |
| 8,185,463 | B1 * | 5/2012 | Ball | 705/36 R |
| 2005/0177509 | A1 * | 8/2005 | Mahaney et al. | 705/40 |
| 2011/0099123 | A1 * | 4/2011 | Nichols et al. | 705/36 R |

OTHER PUBLICATIONS

Spousal Benefit Another Key To Social Security Decision Wednesday, Nov. 16, 2005 By Andrea Coombes.*
SOCtAL SF,rIJRITY rAIJC1JLATOR TUT( )RIALS Apr. 14, 2010.*
http://socialsecurityhop.coml/social-security-benefit-calculator Apr. 14, 2010.*
http://www.ssa.gov/planners/benefitcalculators.htm Apr. 14, 2010.*
"Social Security Benefits Calculator", Allsup Online, http://www.allsup.com/, last accessed Apr. 14, 2010.*
"Financial Calculators—Social Security Benefits", http://www2.aigretirement.com, last accessed Apr. 14, 2010.*
Letter dated Dec. 12, 2013, from C. Scott Talbot, of Cooley LLP, with attachments (i.e., Web Post and Jan. 11, 2013 letter from Joel B. Laner to Joe Elsasser).
Society of Actuaries, "Deciding When to Claim Social Security—Managing Retirement Decisions Series"; Copyright 2012.
Book entitled "How to Optimize Retirement Benefits—Social Security Strategies" by: Willam Reichenstein and William Meyer; Copyright 2011.
Article entitled "Social Security: There is a Better Way"; Squared Away Blog: Financial Behavior: Work, Save, Retire.; Center for Retirement Research at Boston College; http://fsp.bc.edu/social-security-there-is-a-better-way/; Dated: Sep. 20, 2012.
Web page; Social Security Explorer; 10,000 Americans turn 62 every day; Demonstrate Your Retirement Expertise and Build Client Trust!; https://www.planfacts.com/subscribe/sse; Copyright 2012.

* cited by examiner

*Primary Examiner* — William Rankins
(74) *Attorney, Agent, or Firm* — Hovey Williams LLP

(57) ABSTRACT

A non-transitory computer readable medium having a computer program stored thereon for directing operation of a processor. The computer program receives personal and financial data for a couple; accesses data for a plurality of Social Security claiming strategies for the couple based on the personal and financial data; and illustrates on a graphical display which of the Social Security claiming strategies would provide the maximum present value of benefits for multiple mortality combinations of the couple so that the couple or an advisor for the couple can quickly ascertain which claiming strategy would provide the maximum benefits for a particular mortality combination.

24 Claims, 8 Drawing Sheets

COMPUTER PROGRAM, SYSTEM, AND METHOD FOR MAPPING SOCIAL SECURITY CLAIMING STRATEGIES

RELATED APPLICATION

This non-provisional application claims the benefit of U.S. Provisional Application Ser. No. 61/618,204, entitled "METHOD, COMPUTER PROGRAM, AND SYSTEM FOR ANALYZING SOCIAL SECURITY BENEFITS," filed Mar. 30, 2012. The identified provisional application is incorporated herein by specific reference.

BACKGROUND

Social Security refers to the Old-Age, Survivors, and Disability Insurance (OASDI) United States retirement program along with the original Social Security Act of 1935 and later amendments. Social Security benefits are the largest source of retirement income for many retirees, but many people don't know when they should begin taking the benefits and often start taking them too soon. Under current laws, each person can begin taking Social Security benefits starting at either age 62 or 62 and one month depending upon the day of month that person was born. However, because monthly Social Security benefits increase with claiming age (currently up to age 70), delaying benefits may be advantageous in many circumstances.

To help retirees decide when it is best to start Social Security benefits, financial advisors and other experts often suggest one or more claiming strategies based on a person's unique situation. As used herein, "claiming strategy" refers to a plan, decision, strategy, etc. as to when a single person should begin taking his or her Social Security benefits or when each partner of a couple should begin taking their own benefits and spousal benefits, when available.

The best claiming strategy depend on a number of interrelated factors, including each person's need for income, marital status, current age, health considerations, other retirement income sources, and expected life expectancy. Many couples (married spouses and other eligible partners) may even benefit from coordinated claiming strategies in which the partners start taking benefits at different times. For example, it may be beneficial for one partner to delay taking benefits as long as possible, while the other partner begins taking benefits earlier. This is because each partner may be eligible for their own benefits based on his or her earnings record and spousal and survivor benefits based on their spouse's earnings record. Thus, the best time for one spouse to claim his or her own retirement benefits can be affected by his or her partner's life expectancy.

SUMMARY

Applicant has discovered that many people are confused about the various possible Social Security claiming strategies even after the strategies have been explained to them. This is especially true for couples, because many different coordinated claiming strategies exist, and the differences between them may be especially difficult to explain and comprehend.

Applicant created the present invention to assist couples and individuals in selecting, comprehending, and comparing different claiming strategies. In general, the present invention accesses data for a plurality of different Social Security claiming strategies and then presents the data in a unique way that enables retirees and other people to more quickly and easily comprehend, analyze, and compare the strategies.

Embodiments of the invention may be partially implemented by one or more computer programs stored on non-transitory computer readable medium for directing operation of a computer system or other computing device. The computer system may be operated by a Social Security consulting company, persons who are investigating their Social Security claiming options, a financial advisor working with the persons, or anyone else.

The computer programs may instruct or otherwise enable the computer system or other computer to receive personal and financial data for a married couple. The data may be entered in the computer system by the couple or a financial advisor working with the couple or may be retrieved from a database of previously entered information. The computer system then accesses data for a plurality of Social Security claiming strategies that were created or identified based on the entered personal and financial data. Any number of Social Security claiming strategies may be identified and/or created, and they may be identified and/or created with any known procedure.

In accordance with one important aspect of the invention, the Social Security claiming strategy that maximizes the present value of the couple's cumulative lifetime benefits is selected for each mortality combination of the couple. Each of the mortality combinations consists of a life expectancy of each of the partners of the couple. For example, one mortality combination may consist of a life expectancy of 75 for a husband and 78 for a wife.

The computer programs then present a graphical display that illustrates which claiming strategy maximizes the present value of cumulative lifetime benefits (frequently shortened to maximizes benefits) for each mortality combination of the couple or individual. With this graphical display, the individual, couple and/or a financial advisor can quickly ascertain which claiming strategy or strategies would provide the maximum present value of cumulative benefits for a particular mortality combination.

An embodiment of the graphical display consists of a grid with two axes, wherein possible life expectancies of one partner are indicated on the horizontal axis, while possible life expectancies of the other partner are indicated on the vertical axis. The grid may also include a number of cells between the two axes, wherein each cell represents a specific mortality combination of the couple. For example, a cell that intersects 75 of one axis and 78 of the other axis represents a mortality combination of 75, 78. For an individual, a single row of life expectancies is presented to evaluate and compare claiming strategies.

In accordance with another important aspect of the invention, the computer programs mark each cell to indicate which claiming strategy maximizes the present value of cumulative lifetime benefits for the mortality combination represented by that cell. For example, the computer programs may assign a unique color to each claiming strategy to be considered and mark each cell with one of the colors to indicate which of the claiming strategies maximizes the present value of lifetime benefits for the mortality combination represented by the cell.

The computer programs may also illustrate the present value of cumulative lifetime Social Security benefits for each mortality combination. For example, the computer programs may list the cumulative benefits associated with each cell when a user places a cursor over the cell or otherwise selects the cell. This enables a person to quickly compare the present value of total benefits to be received for different mortality combinations to see how different life expectancy assumptions affect the selection of a claiming strategy.

In other embodiments of the invention, Social Security claiming strategies are identified for different life expectancies of a single person. The computer programs of the invention then resent a graphical display that illustrates which claiming strategy maximizes the present value of cumulative lifetime benefits for each life expectancy of the person.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
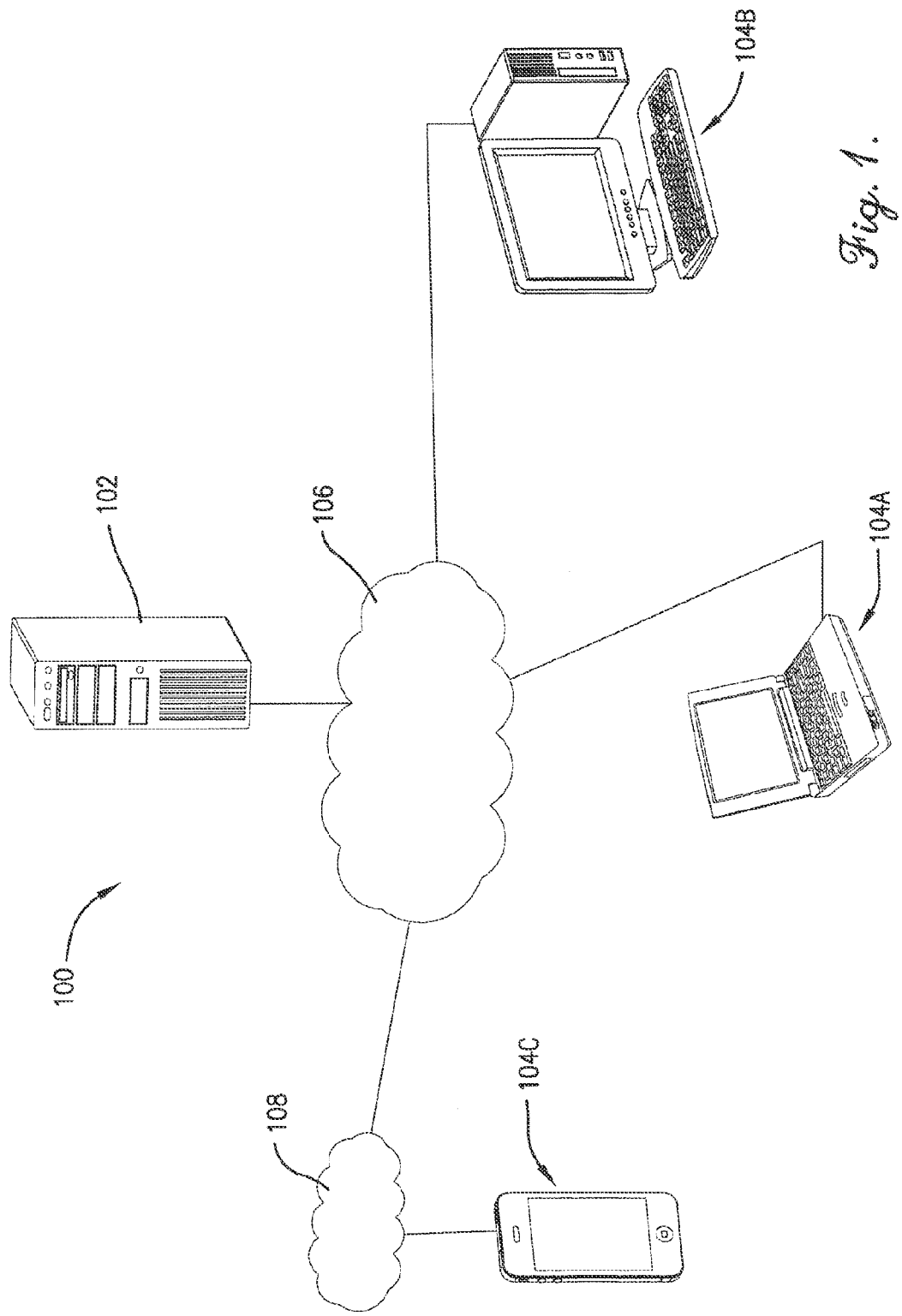
FIG. 1 is a schematic diagram of an exemplary computer and communications system that may be used to implement aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the invention may be implemented with a computer and communications system 100 shown in FIG. 1 and one or more computer programs for operating components of the system 100. One embodiment of the system 100 includes a computer or computer system 102, one or more personal computing devices 104 A-C, and a communications network 106.

The computer system 102 may be operated by a provider of Social Security consulting services or any other entity and may implement one or more computer programs for performing some of the functions described herein. In some embodiments, the computer system 102 provides a web-based portal that can be accessed by the personal computing devices 104 A-C and other devices. For example, users of the computing devices 104 A-C may access the computer system 102 to learn about Social Security benefits and to investigate one or more Social Security claiming strategies as described below.

Embodiments of the computer system 102 may include one or more servers running Windows; LAMP (Linux, Apache HTTP server, MySQL, and PHP/Perl/Python); Java; AJAX; NT; Novel Netware; Unix; or any other software system. The computer system 102 includes or has access to a processor and computer memory and other hardware and software for receiving, storing, accessing, processing, and transmitting information as described below. The computer system 102 may also include conventional web hosting operating software, searching algorithms, an Internet connection, and is assigned a URL and corresponding domain name so that it can be accessed via the Internet in a conventional manner.

The personal computing devices 104 A-C may be any device that can be used by retirees, financial advisors, or other persons to access the computer system 102. The personal computing devices 104 A-C may be desktop computers, laptop computers, tablet computers, mobile phones, etc. Each personal computing device 104 A-C preferably includes or can access a processor, memory, and an Internet browser and a conventional Internet connection such as a wireless broadband connection, DSL converter, or ISDN converter so that it can exchange data with the computer system 102 via the communications network 106.

The communications network 106 may be the Internet or any other communications network such as a local area network, a wide area network, or an intranet. The communications network 106 may include or be in communication with a wireless network 108 capable of supporting wireless communications such as the wireless networks operated by AT&T, Verizon, or Sprint. The wireless network 108 may include conventional switching and routing equipment. The communications network 106 and wireless network 108 may also be combined or implemented with several different networks.

The components of the system 100 illustrated and described herein are merely examples of equipment that may be used to implement embodiments of the present invention and may be replaced with other equipment without departing from the scope of the present invention. Some of the illustrated components of the system 100 may also be combined, eliminated, or changed. For example, in some embodiments, the computer program or programs of the invention may be entirely operated on one of the computing devices 104 A-C such that the computer system 102 is not needed. In other embodiments, the invention may be implemented with just the computer system 102 or a similar computer such that the computing devices 104 A-C are not needed.

Embodiments of the present invention may also comprise one or more computer programs stored in or on computer-readable medium residing on or accessible by the computer system 102 or the personal computing devices 104 A-C. The computer programs may comprise listings of executable instructions for implementing logical functions in the computer system 102 and/or the computing devices 104 A-C and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 2:
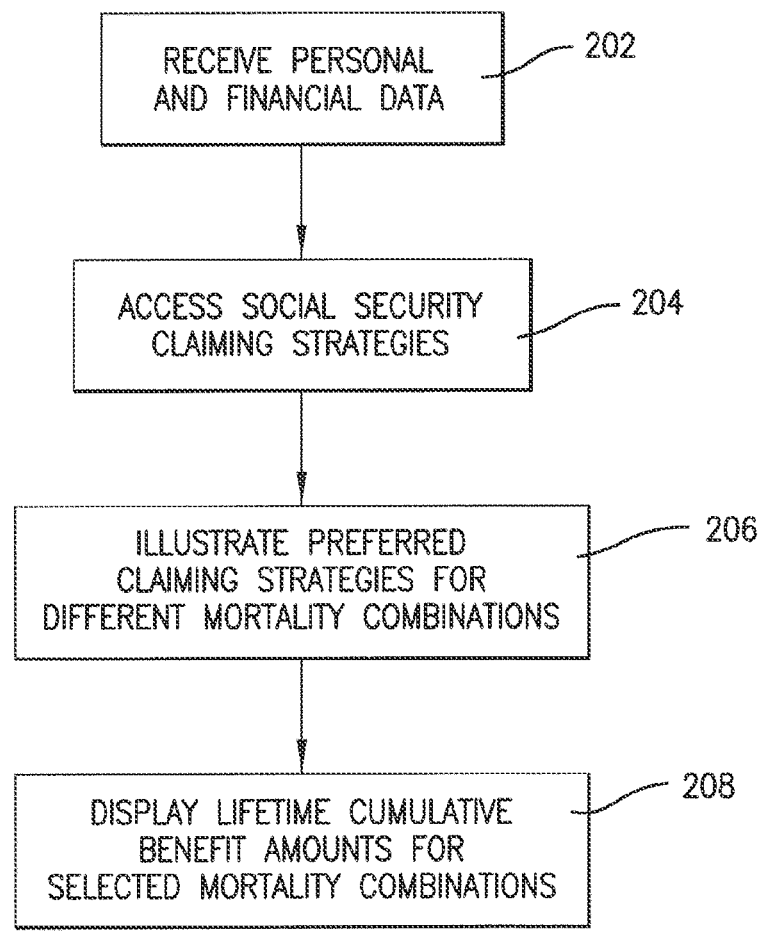
FIG. 2 is a flow diagram depicting steps in a method of the invention and/or portions of a computer program of the invention.

The flow chart of FIG. 2 shows the functionality and operation of an implementation of the present invention in more detail. In this regard, some of the blocks of the flow chart may represent steps in a method and/or a module segment or portion of code of the computer programs of the present invention. In some alternative implementations, the functions noted in the various blocks may occur out of the order depicted in FIG. 2. For example, two blocks shown in succession in FIG. 2 may in fact be performed or executed substantially concurrently, or the blocks may sometimes be performed or executed in the reverse order depending upon the functionality involved.

The method and/or computer programs depicted in FIG. 2 generally begin when personal and financial data are received for a single individual or couple as depicted in block 202. The single individual or couple (henceforth, assumed couple) may be any pair of persons eligible to receive Social Security benefits. For example, the couple may be a married husband and wife who are eligible to receive their own Social Security benefits and/or spousal benefits. The personal and financial data may either be entered into the computer system 102 or one of the computing devices 104 A-C or may be retrieved from a pre-existing database or other information source.

The personal and financial data may include any information used to identify the couple or determine Social Security claiming strategies for the couple. For example, the personal and financial data may include each person's name, date of birth, current age, life expectancy, full retirement age (FRA), primary insurance amount (PIA), estimated retirement spending needs, and retirement income other than Social Security benefits.

FRA for a person (also known as normal retirement age) is determined by the Social Security Administration and is based on the year the person was born. It is the age at which the person receives his or her full PIA each month if the person claims his or her own retirement benefits at that age. If a person claims benefits earlier than FRA, his or her monthly benefit will be reduced, and if the person claims benefits after the FRA, his or her monthly benefits will be increased. The FRA for individuals varies by birth year. For persons born in 1937 or earlier, FRA is currently 65. For persons born in 1960 or later, FRA is currently 67. (Actually, the Social Security Administration considers someone to attain an age one day before that day. So, someone born on Jan. 1, 1960 attains age 62 in December 2021. Similarly, he or she would attain age 62 and one month on Jan. 31, 2022. This unusual dating feature is embedded in our programs, but for ease of discussion, we ignore it here.) For persons born between 1938 and 1959, FRA is currently between age 65 and 67. The Social Security Administration provides a full retirement age chart for every year between 1938 and 1959. The FRA may be changed by Congress, so the present invention is not limited to any particular FRA.

PIA is the amount of monthly Social Security benefits a person will receive if he or she claims benefits at his or her FRA. It is currently calculated with a formula that accounts for the person's 35 highest earning years of work history. Years of income before age 60 are adjusted for average wage level in the U.S., then the 35 years of adjusted earnings are averaged to find an average indexed monthly earnings, or AIME. PIA can be closely estimated from a person's Social Security Statement or at www.ssa.gov. As with FRA, Congress may change PIA, so the present invention is not limited to any particular PIA values.

The following is an example of personal and financial data that may be entered or otherwise accessed for a married couple. The husband, Tim, is currently 63, and the wife, Sally, is currently 60. Tim is referred to as the "Client" and Sally as the "Spouse" in the examples described below. Both Tim and Sally have a FRA of 66. Based on his earnings, Tim has a PIA of $2,000 per month, and based on her earnings, Sally has a PIA of $500 per month. Both Tim and Sally are eligible for their own benefits and spousal benefits. Tim and Sally have self-reported life expectancies of 86 and 83, respectively. Their estimated retirement spending needs are $80,000, and they will have an estimated $15,000 of earned income for the next 6 years of retirement in addition to their expected Social Security benefits.

Once the personal and financial data are entered or otherwise accessed, several possible Social Security claiming strategies for the couple are calculated or identified as depicted in block 204 of FIG. 2. The Social Security claiming strategies may be calculated based on the couples' personal and financial data with computer programs residing on the computer system 102 or one of the computing devices 104 A-C. Or, pre-calculated Social Security claiming strategies may be accessed from the computer system 102, one of the computing devices 104 A-C, or another computer. Any number of possible Social Security claiming strategies may be calculated or identified, and the claiming strategies may be identified or created in various ways. Specific exemplary Social Security claiming strategies are discussed below in connection with the screen displays of FIGS. 3-5.

As described in detail below, the present invention illustrates the Social Security claiming strategy that maximizes the present value of the couple's cumulative lifetime benefits for multiple different mortality combinations of the couple. Thus, the couple can quickly and easily identify which Social Security claiming strategy would provide the maximum present value of benefits based on their self-reported life expectancies. As used in this application, "mortality combination" means the life expectancies of both partners of a couple. For example, a mortality combination of 78, 75 may consist of a life expectancy of 78 for a Client and 75 for a Spouse.

In the examples illustrated below, the couples' life expectancies, and hence their mortality combinations, are assumed to be between 75 and 95 years of age, however, any age range may be used. Applicant selected 75 and 95 as the bounds of the age ranges because mortality combinations at or below 75, 75 tend to have one preferred claiming strategy and mortality combinations at or above 95, 95 tend to have another preferred claiming strategy. Thus, if a couple expects their life expectancies to be less than 75, they can simply pick the Social Security claiming strategy associated with the mortality combination of 75, 75. Likewise, if a couple expects their life expectancies to be greater than 95, they can pick the Social Security claiming strategy associated with the mortality combination 95, 95.

Life expectancies and mortality combinations are expressed in years in this patent application, but they may be expressed in other intervals such as months or ranges of years. For example, one set of life expectancies for a couple, and hence one mortality combination, may be 75-80 for the husband and 80-85 for the wife.

In accordance with one important aspect of the invention, the Social Security claiming strategy that maximizes the present value of the couples' cumulative lifetime benefits is selected for each possible mortality combination of the couple. This strategy is sometimes referred to in this application as the Primary Strategy or primary strategy and at other times as the maximizing strategy or preferred strategy. For each specific mortality combination of the couple, the invention selects one primary claiming strategy. For example, in one embodiment, a primary claiming strategy is calculated or identified for the mortality combination 75, 75 and every other combination up to 95, 95. However, the claims of the present application are not limited to these specific claiming strategies, as other claiming strategies may be "preferred" for other reasons.

For each mortality combination, numerous different claiming strategies are considered to identify which claiming strategy maximizes the present value of cumulative lifetime benefits. In one embodiment, the computer programs of the present invention compare the present values of cumulative Social Security benefits of each claiming strategy for each mortality combination and select the strategy with the highest present value of cumulative Social Security benefits for each mortality combination. For example, if three Social Security claiming strategies result in present values of $600,000, $625,000, and $650,000 in lifetime cumulative benefits for one mortality combination of a couple, the computer program selects the third claiming strategy as the primary, maximizing, or preferred one for that particular mortality combination.

Although not always the case, several mortality combinations with similar ages may have the same primary or maximizing claiming strategy. For example, one claiming strategy may be the primary strategy for the mortality combination of 78, 78 and every other mortality combination where both partners have a life expectancy of 78 or younger. Similarly, another strategy may be the primary strategy for the mortality combination of 90, 90 and every mortality combination where both partners have a life expectancy of 90 or older. However, multiple primary claiming strategies typically exist for mortality combinations with life expectancies near the middle of the 75-95 range. Specific Social Security claiming strategies are described in more detail below in connection with the screen displays in the drawings figures.

In accordance with another important aspect of the invention, primary Social Security claiming strategies for different mortality combinations of the couple are then displayed as depicted in block 206. For example, one of the computers 102 or 104 A-C may present a graphical display which illustrates which of the Social Security claiming strategies is the primary strategy for each mortality combination of the couple.

Figure 3A:
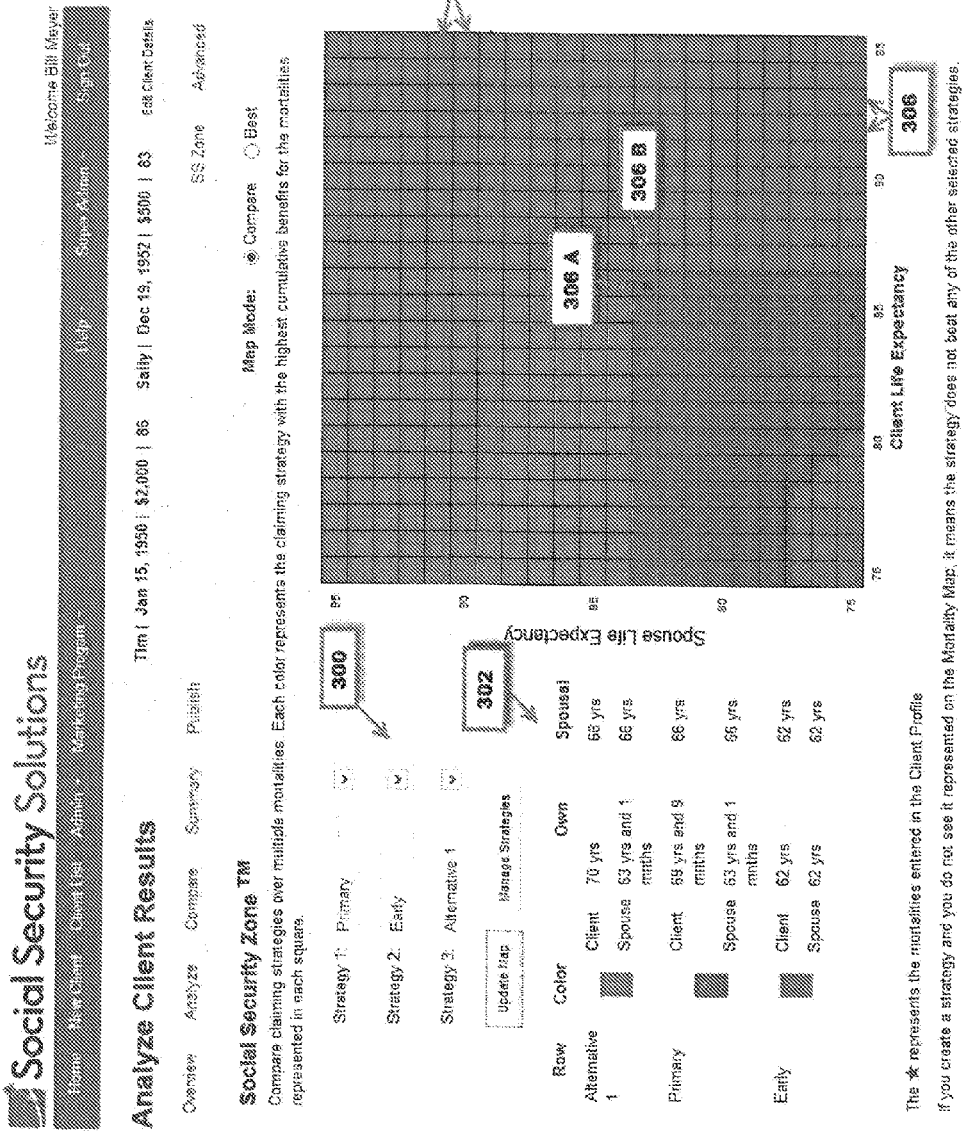
FIG. 3A is an exemplary screen shot rendered by a computer program of the present invention.

FIG. 3A shows an exemplary screen display that may be created and displayed by the computer programs of the present invention to illustrate and compare several Social Security claiming strategies. The screen has a selection box 300 where several (in this example 3) claiming strategies can be selected from drop-down menus. The 3 exemplary strategies include a "Primary" Strategy, an "Early" Strategy, and an "Alternative 1" Strategy. Additionally, a user can click on the Manage Strategy button to create a custom claiming strategy to be available for selection and comparison next to other strategies.

A strategy detail box 302 below the selection box 300 shows details of the selected strategies. In the illustrated example, the Primary Strategy indicates the Client (in this case a husband) should begin taking his own Social Security benefits at age 69 and nine months and spousal benefits at age 66 and the Spouse (in this case a wife) should begin taking her own Social Security benefits at age 63 and 1 month and spousal benefits at age 66. To be more precise, at age 63 and one month she files for her own benefits, which makes him eligible for spousal benefits. That same month, he files for spousal benefits. When she turns FRA, he files and suspends his benefits, which stops his spousal benefits and makes her eligible for spousal benefits. She files a special application for spousal benefits only. At 69 and nine months, he begins to his own benefits. In the Alternative 1 Strategy the wife files for her own retirement benefits at age 63 and one month, and her husband files a special application for spousal benefits the same month. When she turns FRA, he stops spousal benefits, files and suspends his benefits, and she begins spousal benefits. At 70, he switches to his own benefits. The Early Strategy indicates the Client should begin taking his own Social Security benefits at age 63 and three months, which was the earliest month he could begin benefits when we entered the information for this example in March 2013; notice that the invention builds in this logic that says that the early strategy for him is to begin benefits now, which is past age 62 or 62 and one month, that is, past the first month of eligibility. The Spouse should begin taking her own Social Security benefits at age 62 and add spousal benefits at age 62.

For all three strategies, the invention models the detailed rules affecting Social Security benefits. For example, both partners cannot receive spousal benefits at the same time. So, in the Primary Strategy, the wife files for her own retirement benefits at age 63 and one month, and her husband files a special application for spousal benefits the same month. When she turns FRA, he files and suspends his own benefits, which stops his spousal benefits and makes her eligible for spousal benefits. At 69 and nine months, he switches to his own benefit. These and other complexities surrounding spousal and survivor benefits may be considered when selecting the claiming strategies. The Early Strategy was chosen because many retirees begin benefits as early as they can as long as those earnings would not be eliminated by the earnings test. If the partners are retired or have limited income, then they can begin benefits at age 62 or 62 and one month (depending upon the day of month in which they were born). Most people claim at 62 or 62 and one month so this is a good comparison strategy. Furthermore, our invention recognizes that he is older than age 62, so the Early Strategy for Tim is to begin benefits at age 63 and three months, that is, immediately.

The Alternative 1 Strategy is a claiming strategy that we recommend the client consider in addition to the Primary Strategy unless they are only interested in the first criterion discussed next. In general, retirees should consider two criteria when selecting their claiming strategy. First, which strategy would maximize the present value of cumulative benefits based on their precise life expectancies? This is the Primary Strategy. Second, which claiming strategy would minimize or, at least reduce, their longevity risk, that is, the risk that they will deplete their financial resources in their lifetime? Many retirees would be willing to select Strategy X instead of the Primary Strategy if Strategy X entailed lower longevity risk but provided only slightly lower cumulative benefits if the couple lives to their precise life expectancies. That is, there is a tradeoff between the two criteria. When we provide an Alternative 1 Strategy, this is a claiming strategy that fits these characteristics of Strategy X. We believe many, if not most, retirees would consider the tradeoff between these strategies as favoring Alternative 1. In general, the Alternative 1 Strategy would provide lower monthly benefits than the Primary Strategy early in retirement but higher monthly benefits later in retirement. The Alternative 1 Strategy is based on the key tradeoff between the two criteria and is based on informed judgment and key insights relative to retirees' choice of claiming strategies.

The strategy detail box 302 also associates a color, symbol, or other identifier with each claiming strategy. In the illustrated example, the color green denotes the Primary Strategy, red denotes the Early Strategy, and teal denotes the Alternative 1 Strategy. In other embodiments, a first symbol such as a dot may denote the Primary Strategy, a second symbol such as an X may denote the Early Strategy, and a third symbol such as a dash may denote the Alternative 1 Strategy. Any color, symbol, or other identifier may be used to identify and distinguish the different claiming strategies, but colors are preferred because users can intuitively distinguish between them.

The screen of FIG. 3A also shows a graphical display 306 that illustrates which of the Social Security claiming strategies maximizes the present value of cumulative lifetime benefits for each mortality combination of the couple. An embodiment of the graphical display may be a grid with two axes, wherein possible life expectancies of one partner (the client or husband in this example) are indicated in years on the horizontal axis and possible life expectancies of the other partner (the spouse or wife in this example) are indicated in years on the vertical axis. The life expectancies may also be indicated by other intervals such as months or dates of birth. The grid also includes a number of cells 306 between the two axes, wherein each cell represents a specific mortality combination of the couple. For example, a cell that intersects 80 on the horizontal axis and 78 on the vertical axis represents a mortality combination of 80, 78, where 80 represents the husband's life expectancy and 78 represents the wife's life expectancy. The illustrated cells are small squares, but they may be any shape and size.

In accordance with an important aspect of the invention, the computer programs of the invention mark each cell in 306 to indicate which claiming strategy maximizes the present value of benefits for the mortality combination represented by that cell. In one embodiment, the computer programs mark each cell in accordance with the above-described color key to indicate which of the claiming strategies maximizes benefits for the mortality combination represented by that cell. For example, all cells that represent mortality combinations for which the Primary Strategy provides the maximum benefits are colored green; cells that represent mortality combinations for which the Alternative 1 Strategy provides the maximum benefits are colored teal; and all cells that represent mortality combinations for which the Early Strategy provides the maximum benefits are colored red.

The computer programs may also mark the cell corresponding to the couples' self-reported life expectancies with a star or other identifier. For example, as shown in FIG. 3A, the cell 306A corresponding to a mortality combination of 86 and 83 is marked with a star to denote Tim and Sally's self-reported life expectancies.

The display 306 of FIG. 3A allows a couple to quickly and easily visualize which claiming strategy provides the maximum benefits and is thus the Primary Strategy for each mortality combination. For example, the cell 306A that represents Tim and Sally's self-reported mortality combination of 86, 83 has a star in it. In addition, it is colored green because the Primary Strategy provides the maximum benefits for that mortality combination. The display also allows the couple to visualize how different life expectancies could change their maximizing strategy. In the illustrated example, if either spouse lives at least one year longer than expected then the Alternative 1 Strategy would provide the maximum benefits. Therefore, we encourage this couple to compare Alternative 1 and the Primary Strategy when selecting their claiming strategy unless they are only interested in the first criterion of maximizing the present value of cumulative benefits based on their self-selected life expectancies. Finally, if Tim expects to live until age 80 and Sally until 75, the display shows the Early Strategy would provide the maximum benefits because the cell that represents a mortality combination of 80, 75 is red.

Figure 3B:
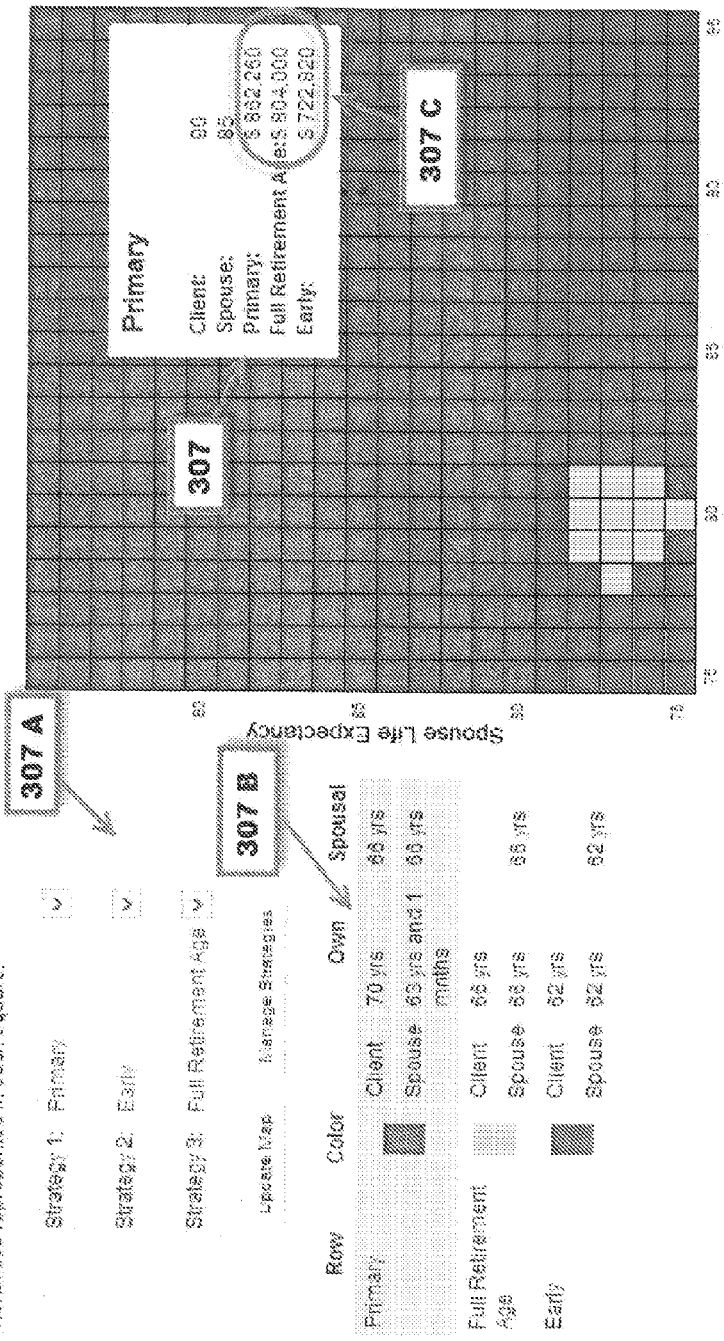
FIG. 3B is an exemplary screen shot rendered by a computer program of the present invention.

FIG. 3B shows another exemplary screen display for this same couple, Tim and Sally, except their life expectancies are 90, and 85, respectively. The selection box 307A shows three claiming strategies. In this example, they include the Primary Strategy, which is the same strategy as Alternative 1 Strategy in FIG. 3A, Full Retirement Age Strategy, and Early Strategy. In addition, the strategy detail box 307B, which is below the selection box, provides details of the three claiming strategies. The Full Retirement Age Strategy indicates Client (i.e., Tim) should claim his own benefits at his FRA of 66. Spouse (i.e., Sally) should claim her own and spousal benefits at her FRA of 66.

FIG. 3B also illustrates the present values of cumulative benefits for each of the three claiming strategies for each mortality combination. In FIG. 3B, the cursor is held over the cell 90, 85 indicating life expectancies of 90 for Tim and 85 for Sally. The box 307C shows that the Primary Strategy provides the maximum present value of cumulative benefits. For this mortality combination of 90, 85, the present value of the Primary Strategy is $862,260, the present value of the Full Retirement Age Strategy is $804,000, and the present value of the Early Strategy is $722,820. Similarly, by moving the cursor over another mortality combination, the invention provides the three present values for that specific mortality combination. This allows clients and their advisor to compare present values and thus indicates whether or not the difference in present values is material.

Figure 4:
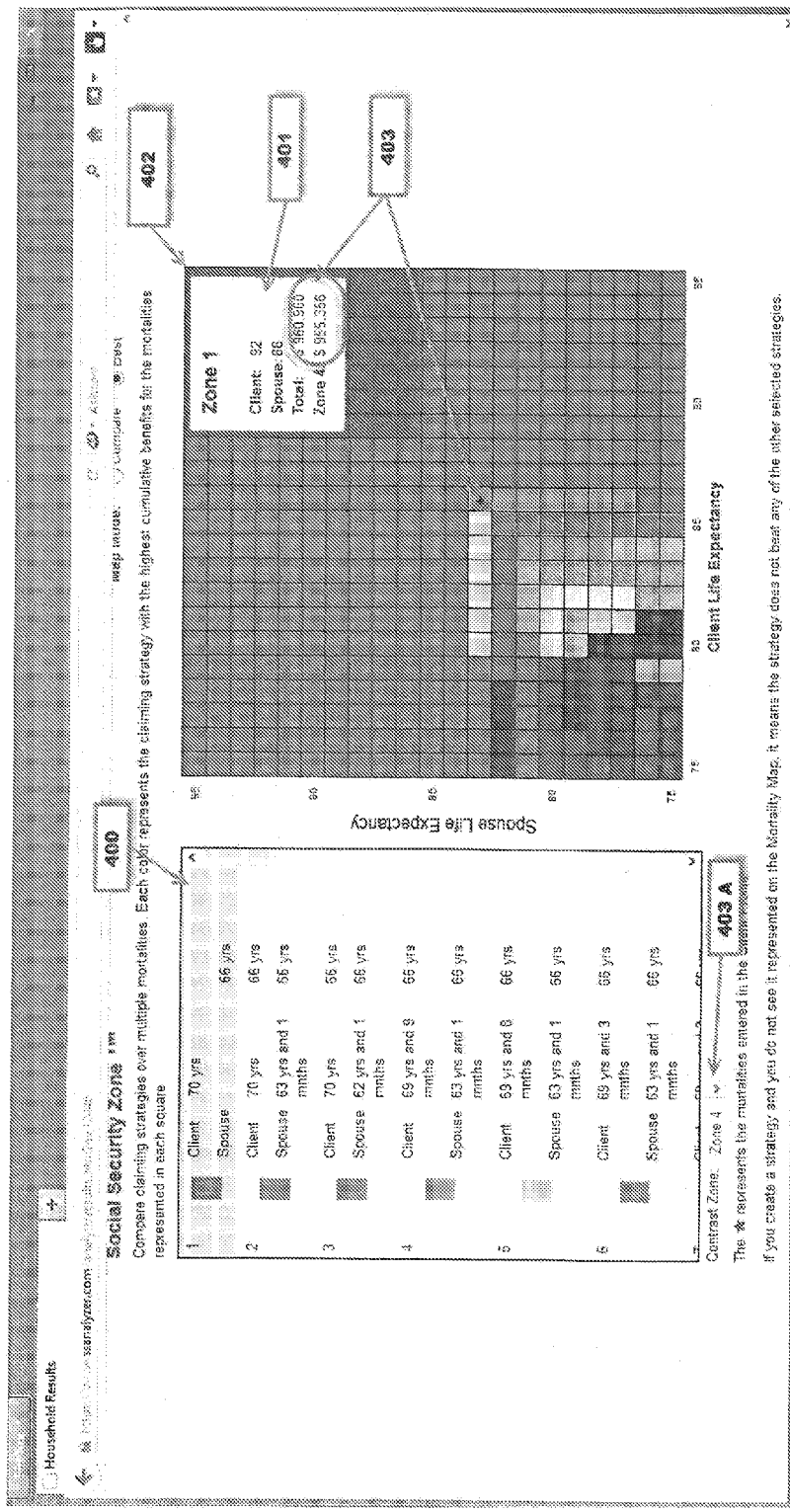
FIG. 4 is another exemplary screen shot rendered by a computer program of the present invention.

FIG. 4 shows another exemplary screen display that may be created and displayed by the computer programs of the present invention for a different couple. The screen of FIG. 4 illustrates and compares optimal Social Security claiming strategies for every mortality combination, not just the preferred claiming strategy from certain selected strategies as in FIG. 3A. Thus, the screen of FIG. 4 does not have the selection box 300 shown in FIG. 3A, but instead just has a key or explanation box 400 that shows details of all optimal claiming strategies. The illustrated example has 15 different claiming strategies denoted by 15 different colors, with 6 of the claiming strategies described in the key box 400 (the other 9 claiming strategies, and in some cases over 50 strategies, are also described in the key box but are not shown on FIG. 4 because of space constraints).

As with FIG. 3A, the screen of FIG. 4 shows a graphical display 402 consisting of a grid with two axes and a number of cells. The grid illustrates which of the Social Security claiming strategies is preferred for each mortality combination of the couple. For example, all cells colored in green indicate the strategy listed first in the key box 400 is preferred for the mortality combinations represented by those cells.

FIG. 4 shows that slightly different life expectancy combinations can result in different maximizing strategies. For example, if the couple predicts their life expectancies will be 86 and 83, the claiming strategy listed fourth is the maximizing strategy. However, if the husband expects to live one year less (for a mortality combination of 85, 83), the claiming strategy listed fifth is the maximizing strategy, and if the husband expects to live one year longer (for a mortality combination of 87, 83), the claiming strategy listed second is the maximizing strategy.

Because many users may be confused by so many different Social Security claiming strategies, the computer programs may allow a user to select the number of claiming strategies to be displayed in FIG. 4. If a lesser number of strategies than the total number of optimal strategies is to be displayed, the computer programs remove the claiming strategies which are optimal for the least number of mortality combinations. For example, if a claiming strategy is only optimal for one mortality combination, it may be removed ahead of claiming strategies that are optimal for multiple claiming strategies.

Figure 5:
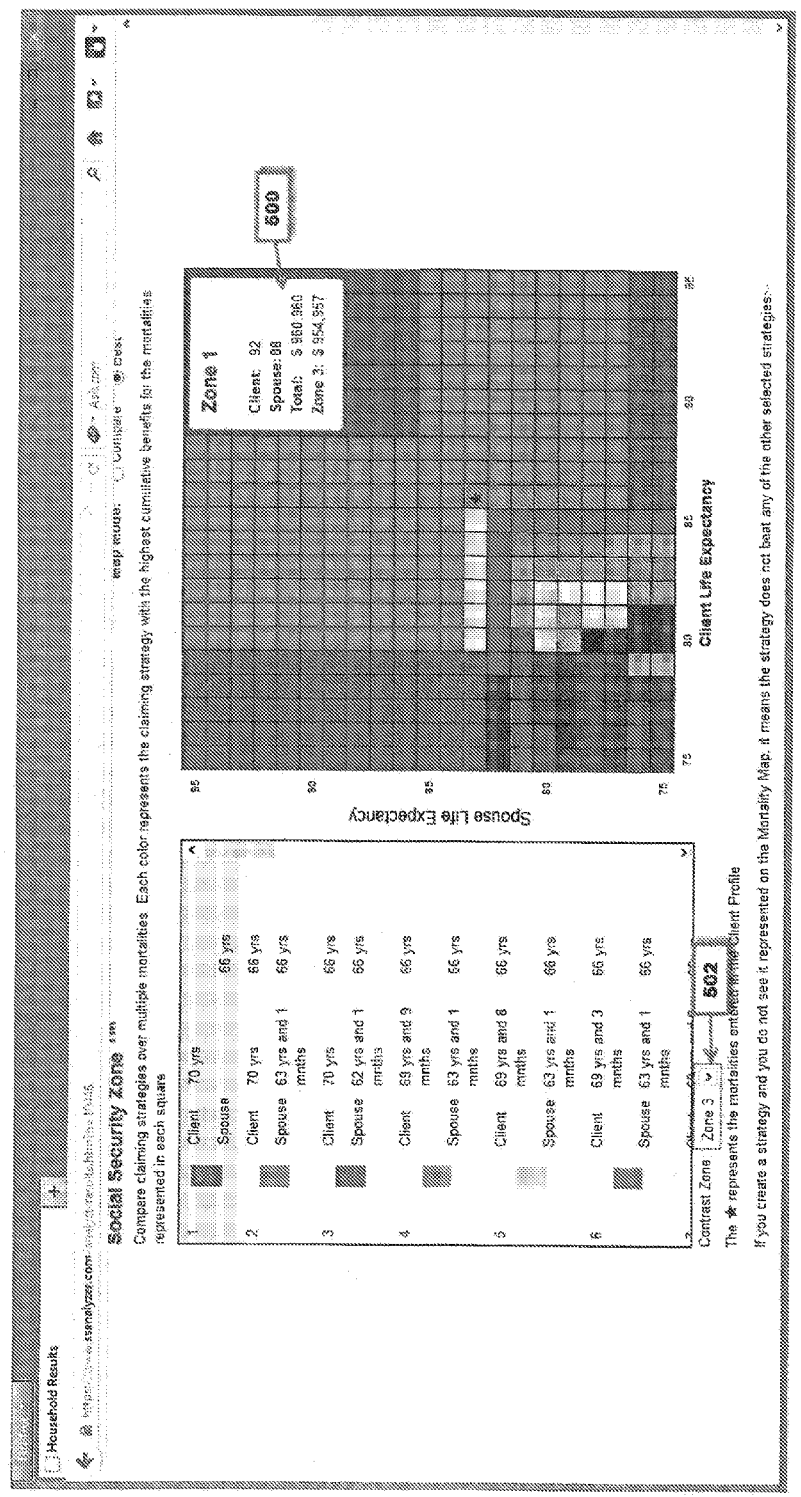
FIG. 5 is another exemplary screen shot rendered by a computer program of the present invention.

The computer programs may also illustrate cumulative lifetime Social Security benefit amounts for each mortality combination as depicted in block 208 of FIG. 2. For example, as shown in FIG. 5, the computer programs may display a box 500 that lists the cumulative benefits associated with a cell when a user places a cursor over the cell or otherwise selects the cell. This enables a person to quickly compare the present values of cumulative benefits to be received for a specific mortality combination. In 500 in FIG. 5 for the mortality combination 92, 88, the present values of cumulative benefits are $960,960 for the Zone 1 strategy and $954,957 for the Zone 3 strategy. By changing the zone selected in the Contrast Zone 502, the client can compare present values of that cell's maximizing strategy and the strategy associated with the selected Contrast Zone. Finally, by moving the cursor or otherwise highlighting different mortality combinations you can see how different life expectancy assumptions affect the present values of competing claiming strategies.

As just noted, the computer programs provide a "Contrast Zone" feature enabled by a drop down menu 502 shown in FIG. 5. This feature displays and compares in the box 500 the cumulative benefits of the Primary Strategy for a selected cell to the cumulative benefits of another claiming strategy (the third listed strategy in the illustrated example) for the same mortality combination. The illustrated example shows that the couple will receive cumulative lifetime benefits of $960,960 with the Primary Strategy (identified by green) and $954,957 with the third (i.e., Zone 3) claiming strategy (purple) if the husband and wife live to 92 and 88, respectively.

Figure 6:
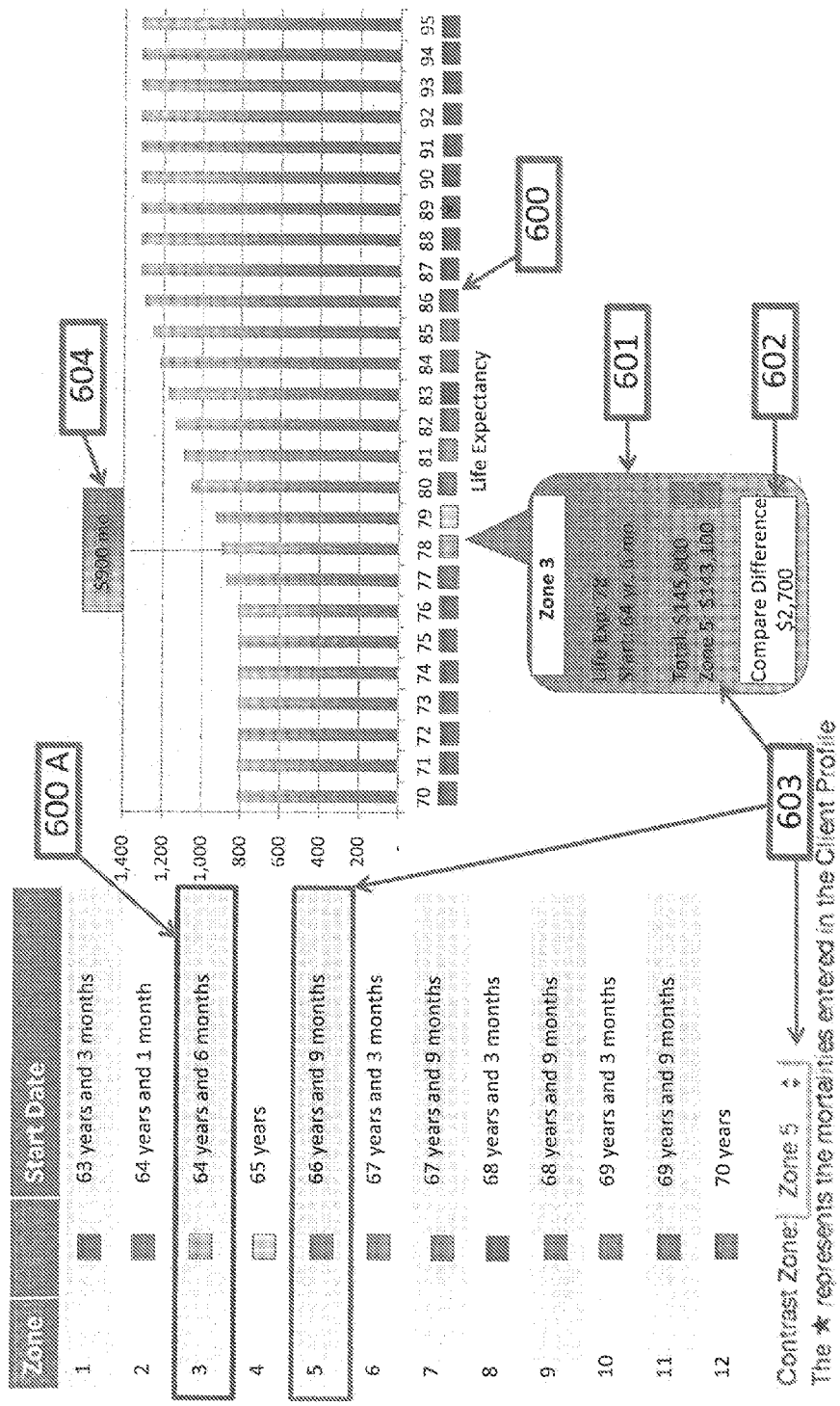
FIG. 6 is another exemplary screen shot rendered by a computer program of the present invention.

FIG. 6 is an exemplary screen shot of the computer programs of the invention for single individuals. The individual considered in this example (henceforth, assumed female) was born on Jan. 3, 1950 and has a Primary Insurance Amount of $1,000. Her FRA is 66. The screen includes a bar graph or other graph with possible life expectancies on the X-axis and monthly benefit amounts on the Y-axis. Each life expectancy on the X-axis is color-coded to show the claiming strategy that results in the most cumulative benefits for that life expectancy.

As shown, the individual has a self-reported life expectancy of 89 as indicated by the star in the 89 square in the row of colored squares that show all the mortality options designed by box 600. As the user scrolls over line 600 with a mouse or cursor, the maximizing or Primary Strategy is highlighted in 600A and the present value of cumulative benefits is indicated. When the cursor is over 89, or age 89 is otherwise indicated, Zone 12 is highlighted in 600A and the present value of cumulative benefits of $300,960 would be indicated. As indicated on the graph, she would have the same Primary Strategy even if her life expectancy were two years shorter at 87 or any number of years longer than her self-reported life expectancy of 89.

FIG. 6 also shows a Contrast Zone feature, which allows the user to dynamically compare different claiming strategies. In this example, if the user clicks on the Zone 5 in 603 and moves the cursor over life expectancy 78 in 600, then the invention 1) highlights Zones 3 and 5 in 600A and 2) presents the present values of cumulative benefits for her if she lives to 78 and claims benefits at 64 years and six months (Zone 3 Strategy) and if she claims benefits at 66 and nine months (Zone 5 Strategy). As shown in 601, the present value of cumulative benefits if she begins benefits at 64 and six months is $145,800, while the present value is $143,100 if she delays benefits until 66 and nine months (Zone 5 Strategy). Thus box 601, which presents the information from this example for the Contrast Zone, allows her to compare the cost in terms of lower lifetime benefits ($2,700 in box 602) if she selects Zone 5 Strategy instead of the Primary Strategy (Zone 3 Strategy) and she lives to age 78.

Box 604 indicates the monthly benefit amounts from each Primary Strategy based on today's PIA. This presents the relative sizes of benefits across all strategies even after adjusting for whatever COLAs may occur in the future. For example, box 604 indicates that monthly benefits would be $900 with the Zone 3 Strategy. By moving the cursor, the user would see that the monthly benefits would be $1,060 with the Zone 5 Strategy, $160 more than in Zone 3 Strategy. Furthermore, line 600 indicates that the Zone 5 Strategy provides more cumulative benefits if she lives to at least 80; dividing $2,700 from box 602 by $160 indicates that the breakeven age is about 79 and five months. These features allow the client to compare the cost at age 78 and benefit in terms of higher monthly benefits and higher cumulative lifetime benefits from the Zone 5 strategy if she lives beyond age 78.

In a similar fashion, the user could compare other strategies like Zone 4 Strategy versus either Zone 3 or 5 Strategy. Therefore, the user could recommend that this retiree, if she had a life expectancy of 78, select among the strategies for Zones 3, 4, and 5. This invention provides the information necessary to help a client make an informed decision about his or her best claiming strategy, that is, one that make the best tradeoff between the two criteria of maximizing benefits based on precise life expectancy and lowering longevity risk by delaying benefits beyond life expectancy.

Figure 7:
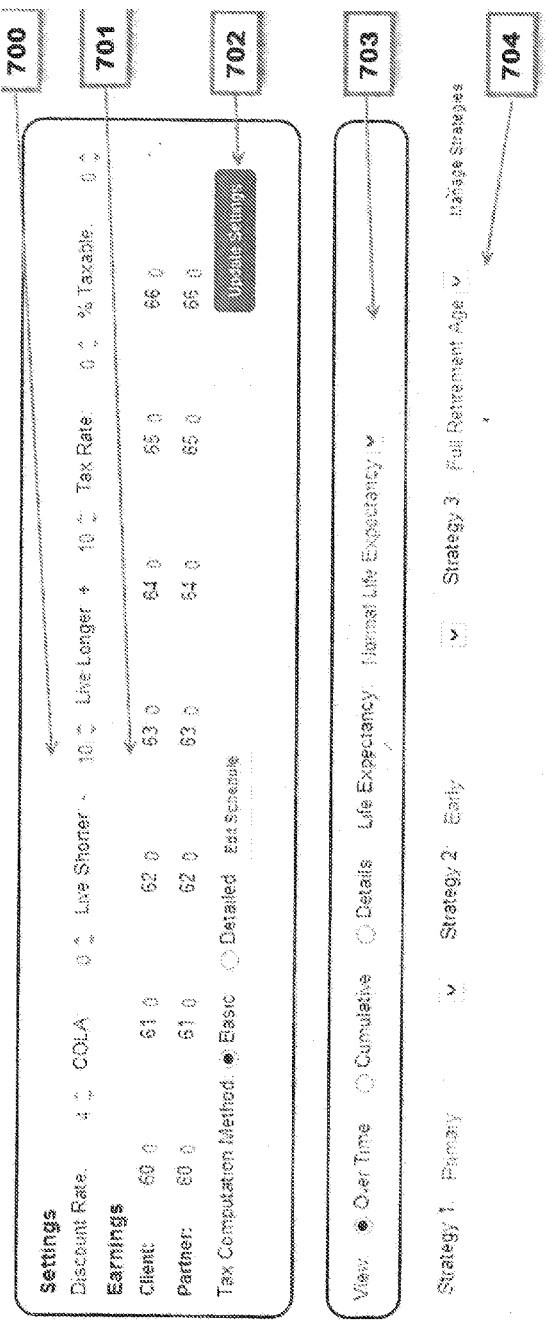
FIG. 7 is another exemplary screen shot rendered by a computer program of the present invention.

FIG. 7 illustrates the settings and views the user can change to compare and evaluate strategies. The View box 703 allows the user to compare the claiming strategies using the Over Time, Cumulative, or Details View. Boxes 700, 701, and 702 indicate the settings that can be changed that impact the individual claiming strategies. Box 700 includes settings to change the discount rate for time value of money calculations, COLA (i.e., cost of living adjustment) changes the inflation rate assumption, Live Shorter and Liver Longer change the mortality assumption where the advisor can allow the Short Life Expectancy to vary from 1 to 10 years shorter than the expected or Normal Life Expectancy and the advisor can allow the Long Life Expectancy to vary from 1 to 10 years longer than the Normal Life Expectancy. Tax Rate and % Taxable change the assumptions regarding the taxation of Social Security benefits for each designed claiming strategy that will be rendered in a comparison view. Box 701 illustrates where the earnings from work by year can be entered for the single Client or married Client and Partner (or Spouse). Earnings in years before the retiree turns Full Retirement Age can affect his or her Social Security benefits for these years, and thus can impact the claiming strategy. Moreover, if benefits are reduced before the retiree turns FRA then our invention adjusts the benefits to be received after turning FRA based on the adjustment the Social Security System would make at FRA. In short, our invention adjusts Social Security benefits based on the earnings test. Not surprisingly, these adjustments both before and after FRA can impact the desirability of competing claiming strategy. In 701, the user can adjust for a "Basic" or "Detailed" method for calculating the taxes, if any, on Social Security benefits. Box 702 shows where the user clicks to update the settings which are then rendered in the Over Time, Cumulative, or Details View as highlighted in box 703. Box 704 shows the areas where the user selects strategies that will be compared within the selected View from Box 703.

The present invention provides numerous advantages over existing programs and methods for comparing Social Security claiming strategies. For example, because the invention illustrates maximizing Social Security claiming strategies for a number of mortality combinations, retirees and/or a financial advisor can quickly and easily ascertain which Social Security claiming strategy is the Primary Strategy for a particular mortality combination. The present invention also allows retirees to visualize how different life expectancy assumptions may affect the choice of a claiming strategy.

Although the invention has been described with reference to the embodiments illustrated in the attached drawing figures, it is noted that equivalents may be employed and substitutions made herein without departing from the scope of the invention as recited in the claims.

The invention claimed is:

1. A non-transitory computer readable medium having a computer program stored thereon for directing operation of a processor to perform the following steps:
   receiving personal and financial data for a couple, the data including an expected life expectancy of each partner of the couple;
   accessing data for a plurality of Social Security claiming strategies for the couple based on the expected life expectancies and for multiple other mortality combinations of the couple; and
   presenting a single graphical display that illustrates which Social Security claiming strategies would provide a maximum present value of cumulative benefits for the expected life expectancies and for the multiple other mortality combinations of the couple so that the couple or an advisor for the couple can ascertain which claiming strategy would provide maximum benefits for the expected life expectancies and for the multiple other mortality combinations.

2. The non-transitory computer readable medium as set forth in claim 1, wherein each mortality combination consists of a life expectancy for each partner of the couple.

3. The non-transitory computer readable medium as set forth in claim 1, wherein the computer program is further operable to direct operation of the processor to illustrate on the graphical display cumulative lifetime Social Security benefits for multiple claiming strategies for each mortality combination of the couple.

4. The non-transitory computer readable medium as set forth in claim 2, wherein the graphical display is a grid with two axes, wherein possible life expectancies of a first partner are indicated in years on the horizontal axis and possible life expectancies of a second partner are indicated in years on the vertical axis.

5. The non-transitory computer readable medium as set forth in claim 4, wherein the grid includes a number of cells between the two axes, wherein each cell represents a specific mortality combination of the couple.

6. The non-transitory computer readable medium as set forth in claim 5, wherein the computer program is further operable to direct operation of the processor to mark each cell to indicate which claiming strategy provides the maximum present value of cumulative benefits for the mortality combination represented by the cell.

7. The non-transitory computer readable medium as set forth in claim 6, wherein the computer program is operable to direct operation of the processor to color each cell to indicate which claiming strategy provides the maximum benefits for the mortality combination represented by the cell.

8. The non-transitory computer readable medium as set forth in claim 1, wherein the personal and financial data further comprise each partner's name, date of birth, full retirement age, primary insurance amount, estimated retirement spending needs, and retirement income other than Social Security benefits.

9. The non-transitory computer readable medium as set forth in claim 1, wherein the plurality of Social Security claiming strategies are selected from a group of Social Security claiming strategies selected by the couple or the advisor for the couple.

10. A non-transitory computer readable medium having a computer program stored thereon for directing operation of a computer, the computer program comprising:
    a code segment for displaying a single graphical display that illustrates which Social Security claiming strategies would provide maximum benefits for a plurality of different mortality combinations of a couple, including a mortality combination with expected life expectancies for the couple and a number of other mortality combinations with life expectancies that are different than the expected life expectancies, so that the couple or an advisor for the couple can ascertain which claiming strategies provide the maximum benefits for a number of different mortality combinations, the graphical display including a grid with two axes, wherein possible life expectancies of a first partner of the couple are indicated on the horizontal axis and possible life expectancies of a second partner of the couple are indicated on the vertical axis, wherein the graphical display further includes a number of cells between the two axes, wherein each cell represents a specific mortality combination of the couple.

11. The non-transitory computer readable medium as set forth in claim 10, wherein each of the mortality combinations of the couple consists of a life expectancy of each partner of the couple.

12. The non-transitory computer readable medium as set forth in claim 10, wherein the computer program further comprises a code segment for illustrating on the graphical display the present values of cumulative lifetime Social Security benefits of multiple claiming strategies for each mortality combination of the couple.

13. The non-transitory computer readable medium as set forth in claim 11, wherein the computer program further comprises a code segment for marking each cell to indicate which claiming strategy provides the maximum present value of cumulative benefits for the mortality combination represented by the cell.

14. The non-transitory computer readable medium as set forth in claim 13, wherein the code segment for marking each cell colors each cell to indicate which claiming strategy provides the maximum benefits for the mortality combination represented by the cell.

15. A computer implemented method of assisting a couple in selecting a Social Security claiming strategy, the method comprising:
receiving in a computer personal and financial data for the couple, the data including an expected life expectancy of each partner of the couple;
accessing with the computer data for a plurality of Social Security claiming strategies for the couple based on the personal and financial data; and
presenting a graphical display on the computer or on another computer in communication with the computer, the graphical display illustrating which of the Social Security claiming strategies would provide maximum benefits for the expected life expectancies of the couple and for multiple other mortality combinations of the couple that consist of different life expectancies for the couple.

16. The computer implemented method of claim 15, wherein each of the mortality combinations of the couple consists of a life expectancy of each partner of the couple.

17. The computer implemented method of claim 15, further comprising the step of illustrating on the graphical display the present values of cumulative lifetime Social Security benefits for multiple claiming strategies for a selected mortality combination of the couple.

18. The computer implemented method of claim 15, wherein the graphical display is a grid with two axes, wherein possible life expectancies of a first partner are indicated in years on the horizontal axis and possible life expectancies of a second partner are indicated in years on the vertical axis.

19. The computer implemented method of claim 18, wherein the grid includes a number of cells between the two axes, wherein each cell represents a specific mortality combination of the couple.

20. The computer implemented method of claim 19, further comprising the step of marking each cell to indicate which claiming strategy provides the maximum benefits for the mortality combination represented by the cell.

21. A non-transitory computer readable medium having a computer program stored thereon for directing operation of a computer, the computer program comprising:
a code segment for displaying a graphical display that illustrates which Social Security claiming strategies result in the most benefits for different life expectancies for a single individual so that the individual or an advisor for the individual can ascertain which claiming strategy would provide more benefits for a particular life expectancy, the graphical display including a single graph that indicates possible life expectancies of the individual and which claiming strategy results in the most benefits for each life expectancy, the graph further indicating which claiming strategy results in the most benefits for a single expected life expectancy of the individual.

22. The non-transitory computer readable medium as set forth in claim 21, wherein the computer program further comprises a code segment for illustrating on the graphical display the present values of cumulative lifetime Social Security benefits of multiple claiming strategies for each life expectancy of the single individual.

23. The non-transitory computer readable medium as set forth in claim 21, wherein the computer program further comprises a code segment for marking the graph to indicate which claiming strategy provides the maximum present value of cumulative benefits for each indicated life expectancy.

24. The non-transitory computer readable medium as set forth in claim 23, wherein the code segment for marking the graph colors each life expectancy entry on the graph to indicate which claiming strategy provides the maximum benefits for the life expectancy represented by the entry.

\* \* \* \* \*